(12) United States Patent
Lee

(10) Patent No.: US 9,381,829 B2
(45) Date of Patent: Jul. 5, 2016

(54) SEAT ELEVATION CONTROL APPARATUS FOR VEHICLE

(75) Inventor: Sang Bok Lee, Chungcheongnam-do (KR)

(73) Assignee: HAN IL E HWA CO., LTD., Seoul (KR)

( * ) Notice: Subject to any disclaimer, the term of this patent is extended or adjusted under 35 U.S.C. 154(b) by 576 days.

(21) Appl. No.: 13/704,757

(22) PCT Filed: Jun. 17, 2011

(86) PCT No.: PCT/KR2011/004463
§ 371 (c)(1),
(2), (4) Date: Feb. 11, 2013

(87) PCT Pub. No.: WO2012/173295
PCT Pub. Date: Dec. 20, 2012

(65) Prior Publication Data
US 2013/0229041 A1    Sep. 5, 2013

(51) Int. Cl.
*B60N 2/16* (2006.01)
*B60N 2/50* (2006.01)
*B60N 2/52* (2006.01)
*B60N 2/02* (2006.01)

(52) U.S. Cl.
CPC ............ *B60N 2/1665* (2013.01); *B60N 2/0228* (2013.01); *B60N 2/16* (2013.01); *B60N 2/502* (2013.01); *B60N 2/505* (2013.01); *B60N 2/508* (2013.01); *B60N 2/525* (2013.01)

(58) Field of Classification Search
CPC .............. B60N 2/16; B60N 2/02; B60N 2/50; B60N 2/1665; B60N 2/0228; B60N 2/502; B60N 2/505; B60N 2/508; B60N 2/525

USPC .................................................. 248/562, 618
See application file for complete search history.

(56) References Cited

U.S. PATENT DOCUMENTS

| 4,946,145 A | 8/1990 | Kurabe |
| 9,010,737 B2 * | 4/2015 | Shin .......................... 267/64.28 |
| 2014/0375096 A1 * | 12/2014 | Lieker ...................... 297/344.12 |

FOREIGN PATENT DOCUMENTS

| KR | 20-0293214 | 10/2002 |
| KR | 100457801 B1 | 11/2004 |
| KR | 100770652 B1 | 10/2007 |

OTHER PUBLICATIONS

International Search Report for PCT/KR2011/004463 Feb. 23, 2012.

\* cited by examiner

*Primary Examiner* — Nkeisha Smith
(74) *Attorney, Agent, or Firm* — Pearne & Gordon LLP

(57) ABSTRACT

A seat elevation control apparatus for a vehicle includes a switch configured to control a relief valve that includes a body, one surface of which has a hook latch at one end thereof, and the other surface of which has a spring connection port, an exhaust port, and a pump connection port protruding therefrom. The switch further includes a button hinged to the other end of one surface of the body and having a hook corresponding to a shape of the hook latch. When the button is pressed down, the hook and the hook latch are coupled to press down on the plunger, and the compressed air in the air spring is exhausted. When the button is pressed down again, the hook and the hook latch are decoupled to return the plunger to its original position, and the compressed air in the air spring is not exhausted.

3 Claims, 3 Drawing Sheets

SEAT ELEVATION CONTROL APPARATUS FOR VEHICLE

BACKGROUND OF THE INVENTION

The present invention relates to a seat elevation control apparatus for a vehicle and, more particularly, to a seat elevation for a vehicle in which a channel for supplying compressed air to an air spring installed on a pneumatic suspension is controlled to exhaust the air from the air spring when a driver gets off, thereby reducing a height of a seat so as to prevent a knee of the driver from impacting a steering wheel and to enable the driver to more easily get on or off.

A damping apparatus mounted on a lower portion of a seat of a vehicle is an apparatus that absorbs shocks transmitted to the seat while the vehicle travels on a road whose surface is uneven, and thereby keeps a height of the seat constant at all times.

The damping apparatus mounted on the lower portion of the vehicle seat is generally made up of upper and lower frames fixing the seat to a vehicle body, an X-shaped link connected between the upper and lower frames, an air spring mitigating shocks transmitted to the seat, and a shock absorber mitigate a vibration amplitude of the air spring.

The damping apparatus of the vehicle seat configured in this way absorbs and mitigates shocks occurring during traveling by means of the air spring and the shock absorber, thereby improving riding comfort to reduce a sense of fatigue in the driver.

However, since the air spring is always subjected to constant air pressure, the seat elevates together with the driver when the driver stands up in the seat, and thus the driver undergoes discomfort because his/her knee impacts a steering wheel.

To solve this problem, an apparatus for exhausting air in the air spring when the driver gets off to prevent the seat from elevating is disclosed in Korean Registered Utility Model No. 20-0293214.

The apparatus disclosed in Korean Registered Utility Model No. 20-0293214 is a seat downturn control apparatus for a car. Referring to FIG. 4 of Korean Registered Utility Model, the seat downturn control apparatus for a car is configured so that a button 11 is pivotably installed on one side of an upper frame 2, and includes a plunger 10c of a release valve 10 at a lower portion of the button 11 and a hook switch 14 catching a protrusion 12 at the lower portion of the button 11 to fix a pushed state of the button 11.

The seat downturn control apparatus configured in this way has drawbacks in that its structure is complicated, and that a wide space for installation is required because the button 11 and the hook switch 14 are independently installed on the upper frame 2, and additionally that a separate bracket is required for installation.

SUMMARY OF THE INVENTION

An embodiment of the present invention is directed to a seat elevation control apparatus for a vehicle, in which a relief valve, a button, and a hook latch are modularized in one body, thereby allowing a function within a simple structure, easy installation even in a narrow space, and simple installation without a separate bracket.

In accordance with an embodiment of the present invention, a seat elevation control apparatus for a vehicle includes: an upper frame configured to support a seat; a lower frame configured to fix the seat to a vehicle body; an X-shaped link configured to connect the upper frame and the lower frame; an air spring configured to absorb shocks to the seat; and a shock absorber configured to mitigate a vibration amplitude of the air spring. A balance valve is provided between the air spring and an air pump and adjusts an amount of compressed air supplied from the air pump to the air spring, and a relief valve is provided between the balance valve and the air spring and exhausts the compressed air of the air spring. A switch configured to control the relief valve includes: a body in which the relief valve is installed, one surface of which has a valve plunger of the relief valve protruding therefrom and a hook latch at one end thereof, and the other surface of which has a spring connection port, an exhaust port, and a pump connection port protruding therefrom; and a button, one end of which is hinged to the other end of one surface of the body, and the other end of which has a hook corresponding to a shape of the hook latch. When the button is pressed down, the hook and the hook latch are coupled to press down on the plunger, and the compressed air in the air spring is exhausted, and when the button is pressed down again, the hook and the hook latch are decoupled to return the plunger to its original position, and the compressed air in the air spring is prevented from being exhausted.

The body of the switch may include elastic couplers, each of which has the shape of a strip elongated in a lengthwise direction and is configured so that opposite ends thereof are coupled to opposite ends of one lateral surface of the body, and so that a middle portion thereof is separated from the body so as to protrude outwards.

Furthermore, the elastic coupler may include coupling steps inclined toward the button on an outer surface thereof.

DESCRIPTION OF SPECIFIC EMBODIMENTS

Figure 1:
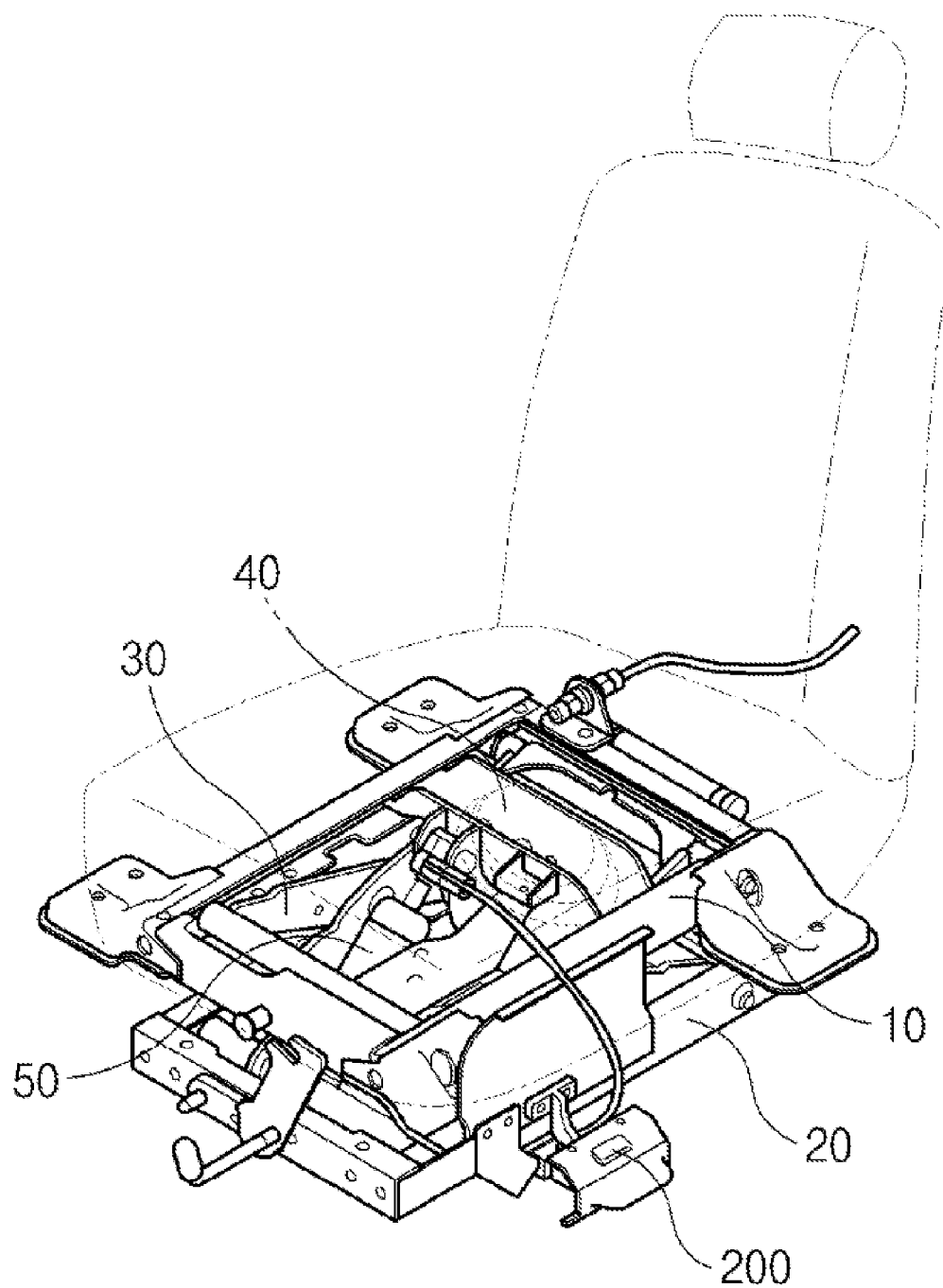
FIG. 1 is a view showing a state in which a seat elevation control apparatus for a vehicle according to an embodiment of the present invention is installed on a seat of the vehicle.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
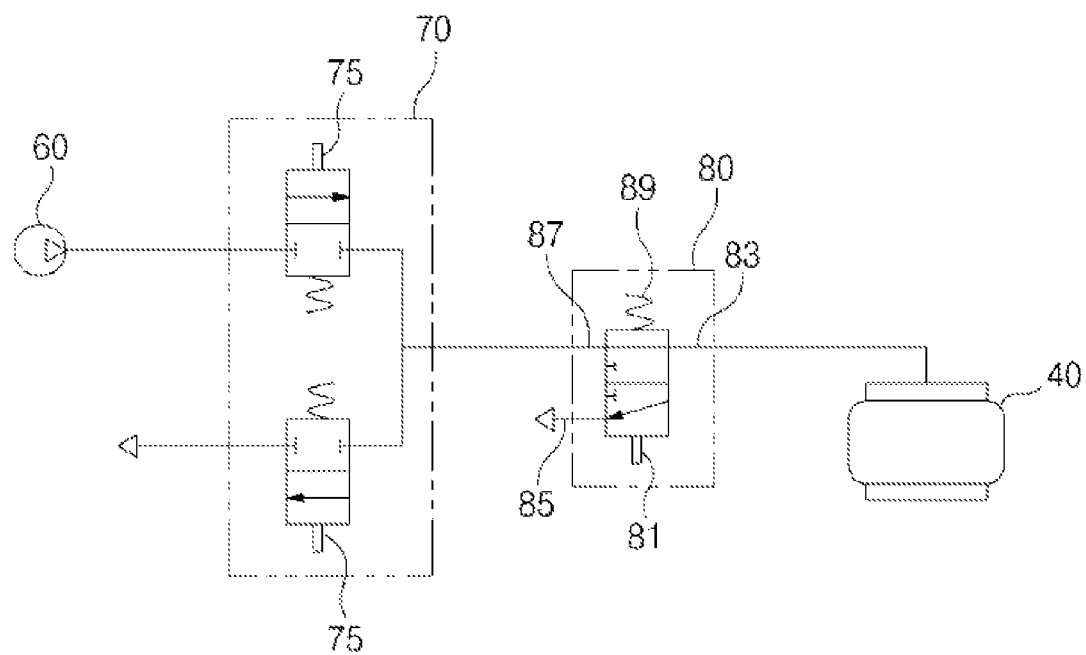
FIG. 2 is a circuit diagram showing an internal configuration of the switch shown in FIG. 1.

FIG. 1 is a view showing a state in which a seat elevation control apparatus for a vehicle according to an embodiment of the present invention is installed on a seat of the vehicle. FIG. 2 is a circuit diagram showing an internal configuration of the switch shown in FIG. 1.

Referring to FIGS. 1 and 2, a pneumatic suspension mounted on a lower portion of a seat of a vehicle includes an upper frame 10 supporting the seat, a lower frame 20 fixing the seat to a vehicle body, an X-shaped link 30 connecting the upper and lower frames 10 and 20, an air spring 40 absorbing shocks, a shock absorber 50 mitigating vibration amplitude of the air spring 40, and a switch 200 exhausting compressed air of the air spring 40.

The aforementioned components are known components that are generally used for pneumatic suspension, and so a detailed description thereof will be omitted.

The air spring 40 is supplied with compressed air from an air pump 60, thereby absorbing shocks applied to a vehicle body. A balance valve 70 is provided between the air spring 40 and the air pump 60, and adjusts an amount of the compressed air supplied from the air pump 60 to the air spring 40.

The balance valve 70 is provided with two plungers 75. When the compressed air in the air spring 40 is short of a predetermined amount and thus the seat is lowered below a predetermined height, one of the plungers is pressed down, and thus a channel connecting the air pump 60 and the air spring 40 is opened. As a result, the compressed air is supplied into the air spring 40. When the compressed air is supplied into the air spring 40, the seat is raised.

Meanwhile, when the compressed air in the air spring exceeds a predetermined amount and thus the seat is raised above a predetermined height, the other plunger is pressed down, and thus an exhaust port connected to air spring 40 is opened. As a result, the compressed air in the air spring 40 is discharged outside, and thus the seat is lowered.

When the vehicle travels on an uneven road surface, the balance valve 70 relieves shocks in such a way that the two plungers 75 are pressed down alternatively, and thus the compressed air is supplied from the air pump 60 to the air spring 40 or the compressed air in the air spring 40 is exhausted.

The switch 200 is provided therein with a relief valve 80. The relief valve 80 is disposed between the balance valve 70 and the air spring 40, and lowers the height of the seat by exhausting the compressed air in the air spring 40.

The relief valve 80 is made up of a valve plunger 81, a spring connection port 83, an exhaust port 85, a pump connection port 87, and an elastic body 89.

The pump connection port 87 is connected with the balance valve 70, and the exhaust port 85 is open to the outside. The spring connection port 83 is connected with the air spring 40.

Under default operation, the pump connection port 87 is connected with the spring connection port 83. Under control of the balance valve 70, the compressed air is supplied from the air pump 60 to the air spring 40, or is exhausted from the air spring 40.

However, when a driver presses down on the valve plunger 81 in order to get off of a vehicle, due to the spring connection port 83 and the exhaust port 85 being connected, the compressed air in the air spring 40 is exhausted outside via the exhaust port 85. Thereby, the height of the seat is lowered. When the height of the seat is lowered, a space between a steering wheel and a knee of the driver is increased, so that it is easier for the driver to get off.

Figure 3:
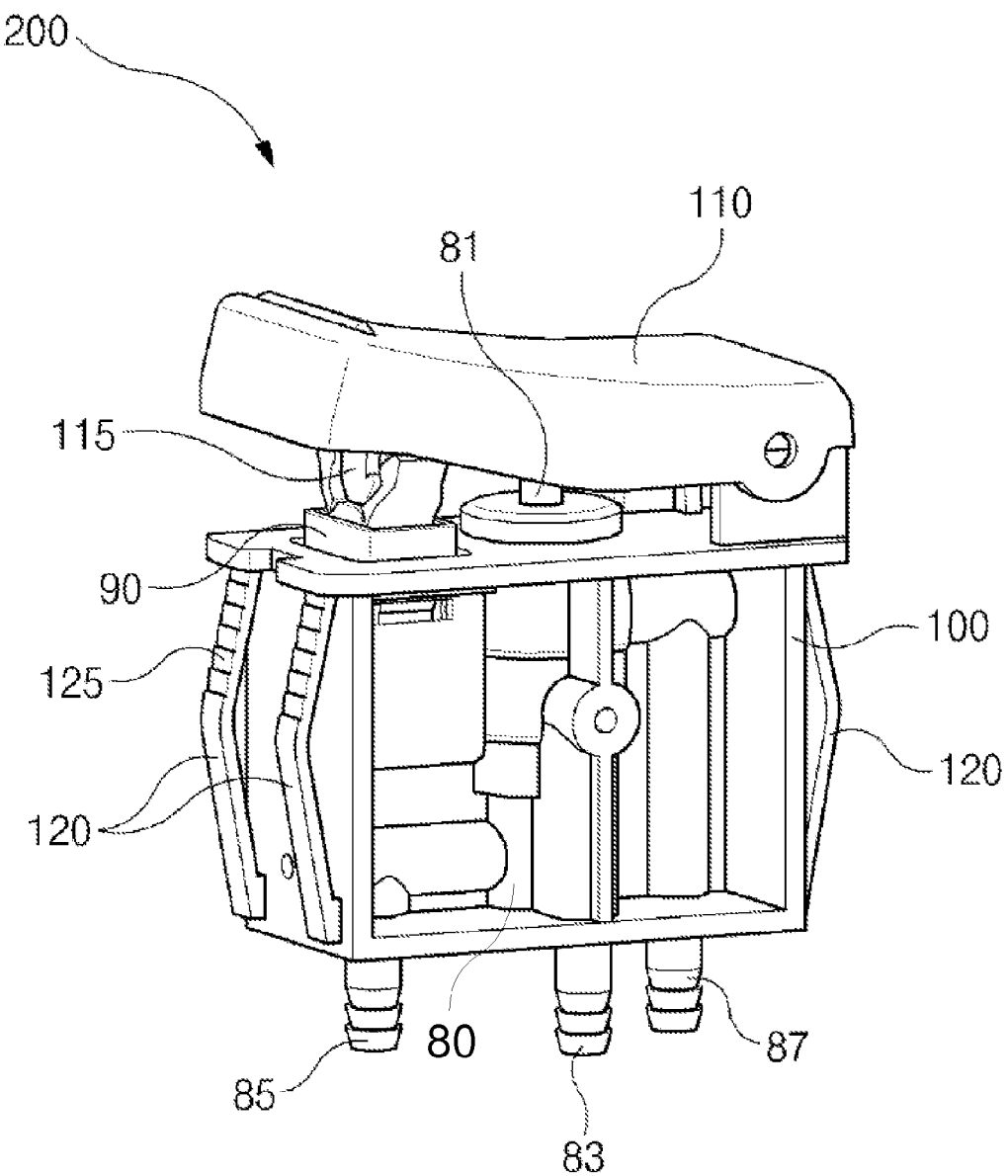
FIG. 3 is a view showing a configuration of the switch of the seat elevation control apparatus for a vehicle according to the embodiment of the present invention.

FIG. 3 is a view showing a configuration of the switch of the seat elevation control apparatus for a vehicle according to the present invention.

Referring to FIG. 3, the switch 200 of the seat elevation control apparatus for a vehicle according to the present invention has the relief valve 80 formed therein, and includes a body 100, one surface of which is provided with a hook latch 90 at one end thereof, and a button 110, one end of which is hinged to the other end of one surface of the body 100, and the other end of which is provided with a hook 115.

The relief valve 80 shown in FIG. 2 is installed in the body 100. The plunger 81 of the relief valve 80 protrudes from one surface of the body 100, preferably from a middle portion of one surface of the body. Further, the pump connection port 87, the spring connection port 83, and the exhaust port 85 preferably protrude from the other surface of the body 100. It is apparent that, if necessary, at least one of the ports may protrude from a surface other than one surface of the body 100 from which the valve plunger 81 protrudes.

The pump connection port 87 is connected with the balance valve 70, and the exhaust port 85 functions as an exhaust hole connected with the outside. The spring connection port 83 is connected with the air spring 40.

The hook latch 90 is provided at one end of one surface of the body 100. The hook latch 90 is a known component, in which, when the hook 115 corresponding to a shape of the hook latch 90 is pressed down so as to be engaged with the hook latch 90, the hook 115 and the hook latch 90 are fixed in a coupled state, and when the hook 115 is pressed down again, the hook 115 and the hook latch 90 are decoupled from each other.

The button 110 is hinged to the other end of one surface of the body 100 at one end thereof, and has the hook 115 corresponding to the shape of the hook latch 90 at the other end thereof.

In the seat elevation control apparatus for a vehicle configured in this way, when a driver pressed down the button 110, the hook 115 and the hook latch 90 are coupled to each other, and thus the valve plunger 81 protruding below the button 110 is correspondingly pressed down with this coupling. Then, the exhaust port 85 and the spring connection port 83 are connected, and thus the compressed air in the air spring 40 is exhausted.

Further, when a driver presses down the button 110 again, the hook 115 and the hook latch 90 are decoupled, and thus the button 110 is raised. In cooperation with this decoupling, the valve plunger 81 provided below the button 110 returns to its original position, and thus the pump connection port 87 and the spring connection port 83 are connected. Thereby, the compressed air in the air spring 40 is no longer exhausted.

In the exemplary embodiment of the present invention, elastic couplers 120 for fixing the seat elevation control apparatus to the vehicle body or the seat frame are provided on two opposite surfaces, i.e. lateral surfaces, of the body 100.

As shown in FIG. 3, each elastic coupler 120 has the shape of a strip elongated in a lengthwise direction. The elastic coupler 120 is configured so that opposite ends thereof are coupled to opposite ends of one lateral surface of the body 100, and so that a middle portion thereof is separated from the body 100 so as to protrude outwards.

Further, each elastic coupler 120 is provided with coupling steps 125 on an outer surface thereof which are inclined toward the button. The coupling steps 125 are preferably formed on the outer surface of the elastic coupler 120 which is inclined from the peak of the middle portion of the elastic coupler 120 toward the button 110.

A cutout portion, which corresponds to the shape of the body 100 and is somewhat larger in shape than the body 100, is formed in a predetermined portion of the vehicle body or the seat frame. The elastic couplers 120 configured as described above are firmly fixed only by fitting the body 100 into the cutout portion. The seat elevation control apparatus for a vehicle according to the exemplary embodiment of the present invention can be easily coupled at a desired position without a separate fixing bracket.

While the present invention has been described with respect to the specific embodiments, it will be apparent to those skilled in the art that various changes and modifications may be made without departing from the spirit and scope of the invention as defined in the following claims.

In the seat elevation control apparatus for a vehicle according to the exemplary embodiment of the present invention, the relief valve, the button, and the hook latch are modularized to reduce a cost of production. Thus, the seat elevation control apparatus can be installed even in a narrow space, and can be installed on the vehicle seat without a separate bracket, so that it consists of easy installation and reduces costs of installation.

What is claimed is:

1. A seat elevation control apparatus for a vehicle, comprising:
    an upper frame configured to support a seat;
    a lower frame configured to fix the seat to a vehicle body;
    an X-shaped link configured to connect the upper frame and the lower frame;
    an air spring configured to absorb shocks to the seat; and
    a shock absorber configured to mitigate a vibration amplitude of the air spring,
    wherein a balance valve is provided between the air spring and an air pump and adjusts an amount of compressed air supplied from the air pump to the air spring, and a relief valve is provided between the balance valve and the air spring and exhausts the compressed air of the air spring, and
    wherein a switch configured to control the relief valve includes:
        a body in which the relief valve is installed, one surface of which has a valve plunger of the relief valve protruding therefrom and a hook latch at one end thereof, and another surface of which has a spring connection port, an exhaust port, and a pump connection port protruding therefrom; and
        a button, one end of which is hinged to the one surface of the body, another end of which has a hook corresponding to a shape of the hook latch, and
    when the button is pressed down, the hook and the hook latch are coupled to press down on the plunger, and the compressed air in the air spring is exhausted, and when the button is pressed down again, the hook and the hook latch are decoupled to return the plunger to its original position, and the compressed air in the air spring is prevented from being exhausted.

2. The seat elevation control apparatus of claim 1, wherein the body of the switch includes elastic couplers, each of which has a shape of a strip elongated in a lengthwise direction and is configured so that opposite ends thereof are coupled to opposite ends of one lateral surface of the body, and so that a middle portion thereof is separated from the body so as to protrude outwards.

3. The seat elevation control apparatus of claim 2, wherein the elastic coupler includes coupling steps inclined toward the button on an outer surface thereof.

* * * * *